United States Patent [19]

Pietsch

[11] 3,949,610
[45] Apr. 13, 1976

[54] PRESSURE INDICATOR FOR RAILWAY CARS
[75] Inventor: Ervin I. Pietsch, St. Charles, Mo.
[73] Assignee: ACF Industries, Incorporated, New York, N.Y.
[22] Filed: Aug. 26, 1974
[21] Appl. No.: 500,791

Related U.S. Application Data
[62] Division of Ser. No. 388,295, Aug. 14, 1973.

[52] U.S. Cl. .............................. 73/406; 116/114 PV
[51] Int. Cl.² .......................................... G01L 7/08
[58] Field of Search .......... 73/396, 406, 419, 146.8, 73/409, 420; 116/70, 114 PV

[56] References Cited
UNITED STATES PATENTS

| | | | |
|---|---|---|---|
| 1,392,587 | 10/1921 | Low | 73/419 |
| 1,497,441 | 6/1924 | Henemier et al. | 73/419 |
| 2,903,888 | 9/1959 | Gföll | 73/146.8 |
| 3,283,584 | 11/1966 | Coffing | 73/419 |
| 3,779,080 | 12/1973 | Smith | 73/396 |

Primary Examiner—Donald O. Woodiel
Attorney, Agent, or Firm—Henry W. Cummings

[57] ABSTRACT

In accordance with the present invention, a pressure indicator is mounted upon a railway car and is in communication with an opening into the pressure chamber of the car. The car may be, for example, a pressurized hopper car or a pressurized tank car. The indicator comprises a fixed assembly having a resilient member so engaging said fixed assembly that the resilient member may react against the fixed assembly. A movable assembly is provided, at least a portion of which is used to indicate the pressure in the chamber. A flexible diaphragm is provided in the indicator, preferably a rolling diaphragm, which is affixed to the fixed assembly and the movable assembly and enables the pressure applied to the indicator to be applied to the movable assembly against the bias of the resilient member and permit at least a portion of the movable assembly to indicate the pressure range in the tank. Preferably the indicating portion is color coded.

4 Claims, 6 Drawing Figures

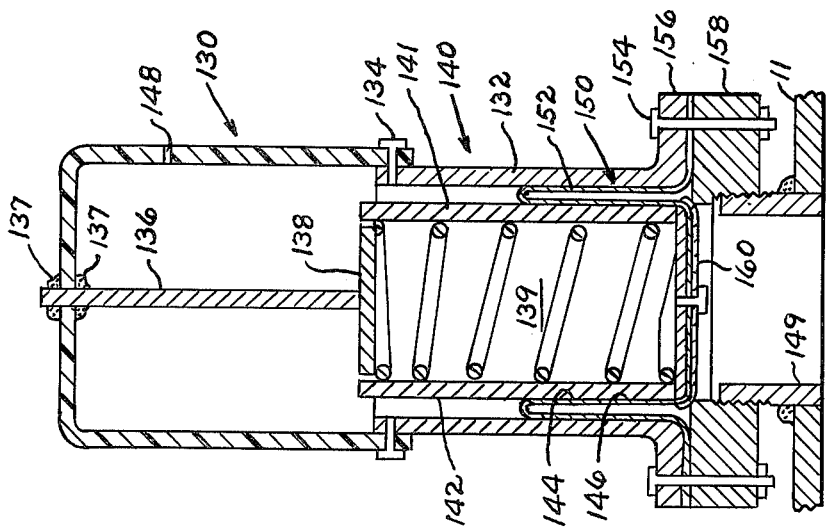
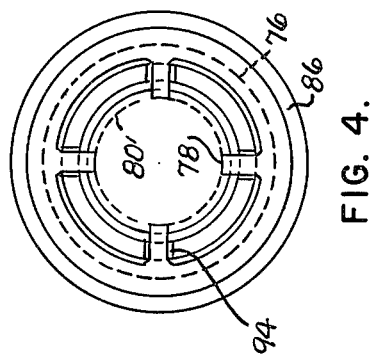
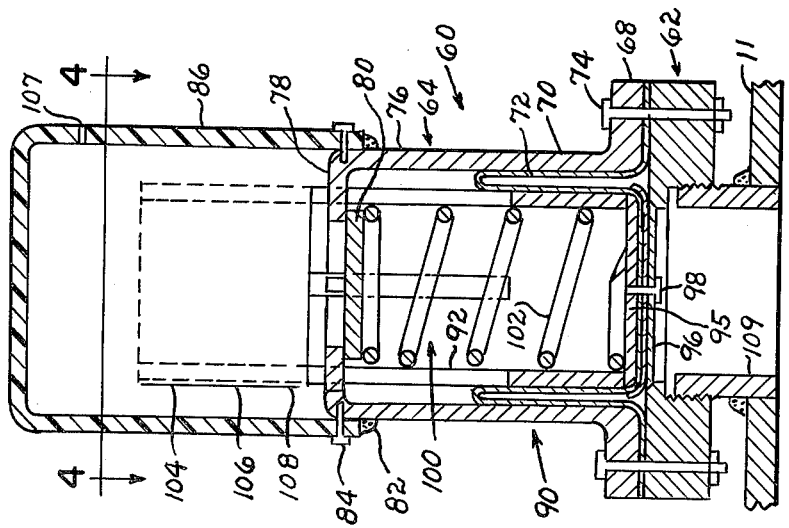

PRESSURE INDICATOR FOR RAILWAY CARS

This is a division of application Ser. No. 388,295, filed Aug. 14, 1973.

BACKGROUND OF THE INVENTION

This invention relates to pressure indicators for railway cars.

One object of the present invention is to provide a pressure indicator which can be mounted on a railway car and in which the pressure range within the car can be viewed from the side of the car.

Another object of the present invention is to provide such an indicator which is simple in operation and inexpensive to manufacture.

Other objects will be apparent from the following description and drawings.

THE DRAWINGS

FIG. 3 is a sectional view of another embodiment of the pressure indicator of the present invention with the non-pressure position shown solid and the pressurized position shown dotted;

FIG. 4 is a view along the line 4—4 in FIG. 3;

FIG. 6 is a sectional view of another embodiment of the pressure indicator of the present invention with the non-pressure position shown solid and pressurized position shown dotted.

SUMMARY OF THE INVENTION

In accordance with the present invention, a pressure indicator is mounted upon a railway car and is in communication with an opening into the pressure chamber of the car. The car may be, for example, a pressurized hopper car or a pressurized tank car. The indicator comprises a fixed assembly having a resilient member so engaging said fixed assembly that the resilient member may react against the fixed assembly. A movable assembly is provided, at least a portion of which is used to indicate the pressure in the chamber. A flexible diaphragm is provided in the indicator, preferably a rolling diaphragm, which is affixed to the fixed assembly and the movable assembly and enables the pressure applied to the indicator to be applied to the movable assembly against the bias of the resilient member and permit at least a portion of the movable assembly to indicate the pressure range in the tank. Preferably the indicating portion is color coded.

DETAILED DESCRIPTION

Figure 2:
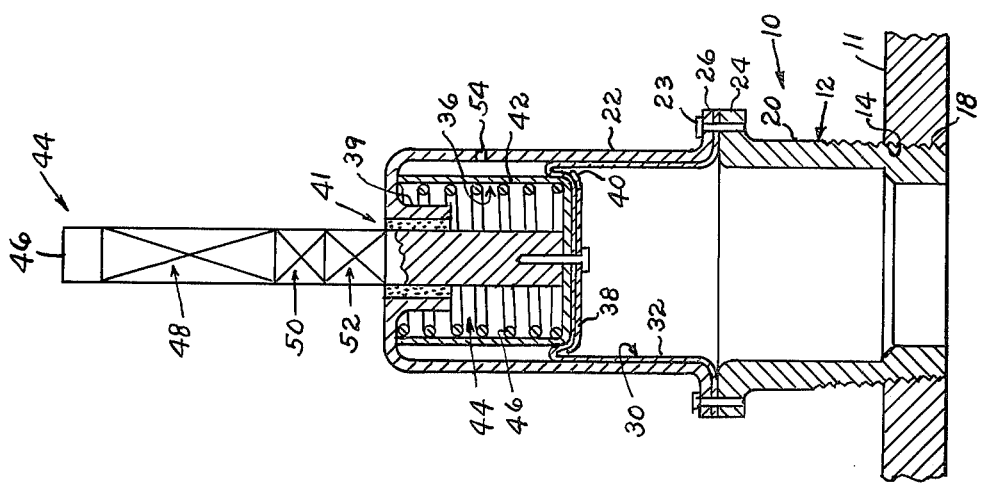
FIG. 2 is a view of the embodiment shown in FIG. 1 illustrating the indicator in a pressurized position.
Figure 1:
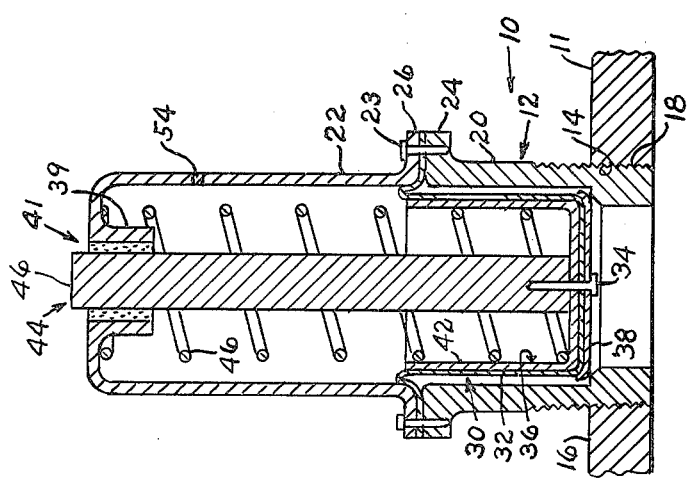
FIG. 1 is a sectional veiw of one embodiment of the pressure indicator of the present invention in a non-pressurized position.

One embodiment of the pressure indicator of the present invention is indicated in FIGS. 1 and 2 generally at 10. The indicator is mounted upon a railway car 11 having an opening therein 14. Pressure indicator 10 comprises a fixed portion 12 having means thereon for fixing the indicator on the car and in communication with the opening 14. For example, threads 16 may be provided on the indicator which cooperate with threads 18 on the car opening. Fixed assembly 12 preferably comprises a lower portion 20 and an upper portion 22 held together by appropriate fasteners, for example, screws 23. Mounted between members 20 and 22, for example, at flange portions 24 and 26 is a flexible diaphragm means indicated generally at 30. The flexible diaphragm preferably comprises a rolling diaphragm 32.

Rolling diaphragm 32 at about its mid-point is affixed by means of appropriate fasteners 34 to movable assembly indicated generally at 36. Movable assembly 36 comprises a plate 38 having a circumferential flange portion 40. Movable assembly 36 further includes a tubular member 42 surrounding a resilient member indicated generally at 44, for example, comprising a coil spring 46.

Upwardly extending fixed housing 22 preferably comprises a downwardly extending portion 39, for example, cylindrical, which contains a seal member indicated generally at 41. Seal member 41 is preferably of the elastomeric type and may be made of any of the known natural or snythetic elastomeric materials.

Passing through seal member 41 is an upwardly extending indicating member indicated generally at 44. Indicator member 44 preferably comprises a tube or rod shaped member 46 affixed with appropriate means, for example, screws 34 to tubular member 42 and plate 38. Tube or rod 46 preferably has colored portions thereon, for example, 48, 50 and 52. Obviously the number of colored portions may vary as desired. The colored portions may be provided for example, by painting, coating or dipping member 46 to obtain color codings as desired.

The position shown in FIG. 1 is the position of the indicator at the zero pressure level. When pressure is applied to the indicator from the tank 11, the pressure is applied to movable assembly 36, particularly lower plate 38. The pressure acts against the bias of resilient means 44 and the movable assembly moves upwardly. As the assembly moves upwardly, first, color portion 48 is exposed indicating one pressure level. Then a second color portion 50 is exposed at a higher pressure. Finally, at the highest pressure level when the assembly is in a position shown in FIG. 2, the color portion 52 is exposed.

By way of example, if the railway car 11 is a 5 psi hopper car, and no color is exposed, it indicates a pressure of plus or minus 0.25 psi. Emergence of the color 48 indicates a pressure of from around 0 up to about 5 psi. Color 50 indicates a pressure from about 5 up to about 7 psi. Pressures above 7 psi are indicated by the color 52. Pressure above about 10 psi will not result in further extension of rod 46. However, it will be apparent to the operator that when color 52 is visible there is an over-pressure in the car. A bleed hole 54 drilled in upper portion 22 vents the cavity above the rolling diaphragm 30 to the atmosphere, to prevent pressure buildup in the upper cavity. This allows this device to measure gauge pressure with respect to the atmosphere. Bleed hole 54 will be relatively small, approximately 1/64 inch in diameter.

Another embodiment of the indicator of the present invention is shown in FIG. 3. The fixed housing assembly is indicated generally at 60 and comprises a lower fixed portion 62 and an upper fixed portion 64. The upper and lower fixed portions preferably include flange portions 66 and 68. A flexible diaphragm indicated generally at 70 preferably comprising a rolling diaphragm 72 is held in place between flange portions 66 and 68 by means of appropriate fasteners 74. Upper fixed housing portion 64 preferably comrpises a cylindrical portion 76 having a plurality of inwardly extending ribs 78, as shown in FIG. 4. Ribs 78 hold in place a washer or disk 80.

Fixed to cylindrical portion 76 with an appropriate fastening technique, for example, with an appropriate adhesive 82 and/or fasteners 84 is a viewable housing 86. Viewable housing 86 is made of a transparent material, for example, of clear plastic.

The movable assembly of this embodiment is indicated generally at 90 and comprises a cylindrical member 92 having slots therein 94 so spaced as cylindrical member 92 may move upwardly around ribs 78. If desired, a lower plate 96 may be provided, held in engagement with the lower portion 95 of cylindrical member 92 with appropriate fasteners 98. This insures effective engagement between rolling diaphragm 72 and movable member 90.

A resilient means indicated generally at 100, for example, comprising a coil spring 102 is held in place by means or ribs 78 and washer 80, and by movable member 92. The outer portions of cylindrical member 92 may be color coded as indicated at 104, 106 and 108.

A bleed hole 107 drilled in upper visible housing 86 prevents air pressure build up, as discussed hereinbefore.

A threaded pipe sleeve 109 is welded to the top of tank car 11, and lower fixed portion 62 is like threaded to mount the pressure indicator.

As the pressure is applied from the railway car 11 the pressure acts against the bias of resilient means 100 and cylindrical member 92 rises up into the viewable housing 86. The greater the pressure, the further cylindrical member 92 will move up into the housing as shown dotted in FIG. 3. For example, with a tank car set to have a transportation pressure of about 50 psi, resilient means 100 may be designed such that portion 104 indicates a pressure of up to about 40 psi. Color 106 would indicate a pressure of 40 to 60 psi. Color 108 would indicate a pressure above 60 psi and a dangerous condition in the car. Obviously, these particular pressure ranges could be varied by modification or substitution of a resilient means 100 to obtain a different spring rate.

Figure 5:
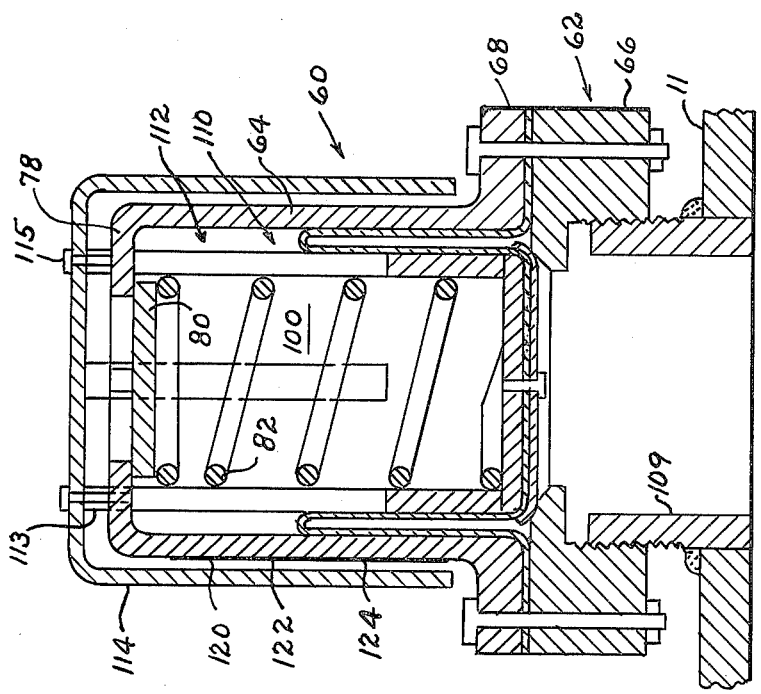
FIG. 5 is a sectional view of another embodiment of the pressure indicator of the present invention with the non-pressure position shown solid and pressurized position shown dotted.

The embodiment shown in FIG. 5 is similar to the embodiment shown in FIGS. 3 and 4, particularly with respect to the fixed assembly 60 of the indicator. Thus, fixed cylinder member 64 having ribs 78 holds a washer or disk 80 in place, which in turn holds a resilient spring 82 in place. Furthermore, movable assembly 110 again comprises a cylindrical portion 112 which is slotted as indicated at 113. Cylindrical portion 112 in this embodiment is affixed by means of an adhesive or appropriate fasteners 115 to a movable external indicating portion 114. Preferably, indicating portion 114 is cylindrical and surrounds the fixed assembly. The external surface of indicating portion 64 then is coated with appropriate colors 120, 122 and 124 to indicate various increasing pressure ranges in the car.

As was the case in FIG. 3, pressure within the car acts against the bias of resilient means 100 and moves cylindrical member 112 upwardly past ribs 78. As the pressure is increased the coated portions 120, 122 and 124 are viewable from the side of the car indicating gradually increasing pressure conditions in the car.

In the embodiment shown in FIG. 6, a viewable housing 130 is affixed to a fixed portion 132 with appropriate fasteners 134. A downwardly extending rod or shaft 136 is affixed to viewable member 130 by means of appropriate fasteners, such as nuts 137. Rod 136 has a disc affixed thereto 138, for example, by welding or brazing. Disc 138 holds a resilient member 139 in place.

A movable assembly indicated generally at 140 comprises a cylinder 141 having color coded portions 142, 144 and 146 is provided which is spaced from the outer periphery of disc 138. A flexible diaphragm 150, preferably comprising a rolling diaphragm 152, is held in place by means of fasteners 154 in flange portions 156 and 158. If desired, a plate 160 may be affixed to the lower portion of cylinder 162 to insure engagement of the flexible diaphragms with cylinder 141 during operation.

As the pressure is applied from inside the car 11 the cylinder 141 moves upwardly against the bias of resilient means 139 and first reveals coded portion 142. As greater pressure occurs in the tank, the portion 144 is observed and finally the portion 146 indicating a dangerous condition. A bleed hole 148 drilled in viewable housing 130 prevents air pressure build up.

A threaded pipe sleeve 149 is welded to the top of tank car 11, and lower fixed portion 158 is like threaded to mount the pressure indicator.

Obviously, the number of coded portions may vary as desired. The spring rates for the resilient means may be varied so as to adapt pressure conditions as low as 5 psi all the way up to pressure conditions as high as 100 psi and higher. Such modifications are within the skill of the art.

What is claimed is:

1. A pressure indicator for a railway car comprising: a fixed assembly having an opening therein in communication with a portion of a railway car adapted to be pressurized;

said fixed assembly comprising a fixed cylinder having a plurality of inwardly extending ribs holding a disk in place, which disk cooperates with a movable assembly to hold within said fixed cylinder and within a portion of said movable assembly a resilient means;

a movable assembly comprising a movable cylinder mounted within said fixed assembly and externally of said resilient means, having a plurality of circumferentially spaced slots aligned with said ribs, said movable assembly comprising a viewable portion viewable from the side of the car;

a flexible diaphragm held in place by said fixed assembly and engaging said movable assembly and adapted to move in response to pressure changes in said railway car whereby an increase in pressure will move said movable assembly against the bias of said resilient means relative to said fixed assembly and indicate pressure change in said car.

2. A pressure indicator according to claim 1 wherein said fixed assembly comprises a transparent viewing portion into which said movable viewable portion moves during an increase in pressure.

3. A pressure indicator according to claim 1 wherein said resilient means comprises a coil spring.

4. A pressure indicator according to claim 1 wherein at least a portion of said movable viewable portion is color coded.

* * * * *